United States Patent
De'Longhi et al.

(10) Patent No.: US 9,901,207 B2
(45) Date of Patent: Feb. 27, 2018

(54) MILK CONTAINER THAT CAN BE ASSOCIATED WITH A COFFEE MACHINE AND COFFEE MACHINE HAVING SUCH A MILK CONTAINER

(71) Applicant: De'Longhi Appliances S.R.L., Treviso (IT)

(72) Inventors: Giuseppe De'Longhi, Treviso (IT); Marco Vaona, Mestre (IT)

(73) Assignee: De'Longhi Appliances S.R.L., Treviso (IT)

( * ) Notice: Subject to any disclaimer, the term of this patent is extended or adjusted under 35 U.S.C. 154(b) by 108 days.

(21) Appl. No.: 14/792,934

(22) Filed: Jul. 7, 2015

(65) Prior Publication Data
US 2016/0000258 A1 Jan. 7, 2016

(30) Foreign Application Priority Data
Jul. 7, 2014 (IT) .............................. MI2014A1239

(51) Int. Cl.
*A47J 31/00* (2006.01)
*A47J 31/44* (2006.01)

(52) U.S. Cl.
CPC ................................ *A47J 31/4485* (2013.01)

(58) Field of Classification Search
CPC . A47J 31/4485; A47J 31/4489; A47J 31/4496
USPC ........................................ 99/293, 323.1, 453
See application file for complete search history.

(56) References Cited

U.S. PATENT DOCUMENTS

| | | | | |
|---|---|---|---|---|
| 5,473,972 A * | 12/1995 | Rizzuto | ............... | A47J 31/4485 99/290 |
| 7,946,219 B2 * | 5/2011 | Marconi | ............. | A47J 31/4485 99/293 |
| 2011/0111109 A1 * | 5/2011 | Fischer | ............... | A47J 31/4489 426/474 |
| 2011/0174162 A1 * | 7/2011 | Ullmann | ............. | A47J 31/4485 99/323.3 |
| 2012/0125202 A1 * | 5/2012 | Remo | ..................... | A47J 31/60 99/286 |
| 2012/0297989 A1 * | 11/2012 | Tonelli | ................ | A47J 31/4485 99/293 |
| 2013/0276636 A1 * | 10/2013 | Rithener | ............. | A47J 31/4485 99/285 |

* cited by examiner

*Primary Examiner* — Michael Laflame, Jr.
(74) *Attorney, Agent, or Firm* — Blank Rome LLP

(57) ABSTRACT

A milk container that can be associated with a coffee machine having in turn an external coffee dispenser that includes a containment body for containing milk; a mixing unit at least having a mixing chamber, a channel for supplying milk to the mixing chamber, a channel for supplying steam to the mixing chamber, a channel for supplying air to the mixing chamber, and an outlet channel for milk mixed with air and steam from the mixing chamber; an external milk dispenser having hooking means to the external coffee dispenser; and at least one flexible pipe for the flexible mechanical and hydraulic connection of the external dispenser of the mixed milk to the outlet channel.

17 Claims, 8 Drawing Sheets

MILK CONTAINER THAT CAN BE ASSOCIATED WITH A COFFEE MACHINE AND COFFEE MACHINE HAVING SUCH A MILK CONTAINER

RELATED APPLICATIONS

This application claims benefit of priority under 35 USC § 119 of Italy Patent Application No. MI2014A 001239, filed Jul. 7, 2014, entitled "Milk Container That Can Be Associated With A Coffee Machine and Coffee Machine Having Such A Milk Container," which application is incorporated herein by reference.

FIELD OF THE INVENTION

The present invention relates to a milk container associated with a coffee machine and a coffee machine having such a milk container.

BACKGROUND OF THE INVENTION

Automatic coffee machines are known having a steam dispenser to which a milk container can be connected equipped with a mixing unit which heats the milk through a controlled flow of steam and potentially emulsifies it through a controlled flow of air before it is directly dispensed into the cup through a milk dispenser.

The milk dispenser can be positioned so as to cooperate with a coffee dispenser present on the front wall of the machine for dispensing a cappuccino or a latte into a cup.

One of the disadvantages complained of traditional milk containers can be found in the movement mechanism for moving the milk dispenser which, with a construction that is sometimes complex, still does not allow the adjustment of the position of the milk dispenser adaptable in a versatile way to the different heights of the cups that can be positioned below the milk dispenser.

The poor adaptation flexibility of the milk dispenser due to the limits of known movement mechanisms limits the productivity of the coffee machine which is often not able to prepare two cappuccinos simultaneously or even one cappuccino when the height of the cups where the drink is served varies.

SUMMARY OF THE INVENTION

The technical task of the present invention is, therefore, to provide a milk container that can be associated with a coffee machine which obviates the above-described technical drawbacks of the prior art.

Within the scope of this technical task, an object of the invention is to provide a milk container that can be associated with a coffee machine that allows the versatile adjustment of the position of the milk dispenser to adapt it to dispensing into cups that may also be of different heights.

Another object of the invention is to provide a milk container that can be associated with a coffee machine that allows the versatile adjustment of the position of the milk dispenser to adapt it to dispensing into at least two cups simultaneously.

Another object of the invention is to provide a milk container that improves the productivity of the coffee machine with which it is associated.

The technical task, as well as these and other objects, according to the present invention are reached by providing a milk container that can be associated with a coffee machine having in turn an external coffee dispenser, comprising:

a containment body for containing milk;

a mixing unit at least comprising a mixing chamber, a channel for supplying milk to the mixing chamber, a channel for supplying steam to the mixing chamber, a channel for supplying air to the mixing chamber, and an outlet channel for milk mixed with air and steam from the mixing chamber; characterised in that it comprises an external dispenser of the mixed milk having hooking means to the external coffee dispenser, and at least one flexible pipe for the flexible mechanical and hydraulic connection of the external dispenser of the mixed milk to said outlet channel.

Advantageously, thanks to the provision of the flexible pipe, the only restriction to the free positioning of the external dispenser for mixed milk with respect to the milk containment body is defined by the length of the flexible pipe which, when needed, by exploiting its intrinsic flexibility, can assume any conformation.

In this way the external milk dispenser can be easily hooked to the external coffee dispenser and its motion can be shared.

Advantageously in the hooked condition the external milk dispenser is oriented with a dispensing direction towards the same dispensing zone in which the external coffee dispenser is oriented.

The set made up of the external coffee dispenser and the external milk dispenser is therefore able to dispense milk and coffee straight into two cups simultaneously appropriately positioned on an underlying resting surface, and the distance above the resting surface can be preliminarily adjusted according to the height of the cups positioned thereon.

The external milk dispenser, when hooked to the external coffee dispenser, therefore assumes a remote position from the milk containment body and adjustable in height above the resting surface, but by bending the flexible pipe, when it is not used, it can be hooked straight to the milk containment body in a minimum overall dimensions configuration.

The milk container, with the external milk dispenser in the minimum overall dimensions configuration, can be kept in the fridge.

In a preferred embodiment of the invention the mixing unit is integrated into a cover of the milk containment body. It is not excluded that the mixing unit in a different embodiment of the invention can be integrated into a part of the milk containment body other than the cover.

In a preferred embodiment of the invention the flexible pipe has a connection terminal that is fixable in a fixing seat obtained in the cover where said outlet channel for the mixed milk emerges. It is not excluded that the fixing seat in a different embodiment of the invention can be afforded in a part of the milk containment body other than the cover.

In a preferred embodiment of the invention the connection terminal has an internal channel for hydraulic connection between said flexible pipe and said outlet channel for the mixed milk.

In a preferred embodiment of the invention the connection terminal is shapingly connected to said fixing seat by a fixed joint. In this way the connection terminal can be easily disengaged from the related fixing seat for inspection and cleaning both of the fixing seat and the inside of the flexible pipe.

In a preferred embodiment of the invention the cover has externally a through opening through the access thickness thereof inside the containment body for loading milk. It is therefore possible to load the container with milk either by removing the cover or without having to remove the cover by means of the through opening in the cover itself.

In a preferred embodiment of the invention the cover has a recess configured for placing the external dispenser for mixed milk back in a minimum overall dimensions configuration when it is unhooked from the external coffee dispenser.

In a preferred embodiment of the invention the opening for loading milk is obtained at the wall of said recess of the cover.

In a preferred embodiment of the invention the external dispenser for mixed milk has two dispensing holes.

In a preferred embodiment of the invention the hooking means is of magnetic type.

In a preferred embodiment of the invention the hooking means is of mechanical type.

The present invention also discloses a coffee machine equipped with a milk container, and in particular having at a front wall thereof an external coffee dispenser that is adjustable in height with respect to a resting surface for cups, and a steam dispensing nozzle connectable with said steam inlet channel of the containment milk.

In a preferred embodiment of the invention the external dispenser for mixed milk is hooked at the front to said external coffee dispenser.

In a preferred embodiment of the invention said external dispenser of the coffee has two dispensing holes.

In a preferred embodiment of the invention said external milk dispenser and said external coffee dispenser are oriented with the two dispensing holes thereof towards an underlying zone for direct dispensing into two cups that are arranged side-by-side on the resting surface.

The productivity of the coffee machine is therefore optimised, since the coffee machine in cooperation with the milk container allows two cappuccinos to be dispensed completely automatically and simultaneously in tall or short cups positioned by the user in the underlying dispensing zone.

Other characteristics of the present invention are also defined in the claims herein below.

BRIEF DESCRIPTION OF THE DRAWINGS

Further characteristics and advantages of the invention will more fully emerge from the description of a preferred but not exclusive embodiment of the milk container and coffee machine according to the invention, illustrated by way of non-limiting example in the accompanying drawings, in which.

DETAILED DESCRIPTION OF THE ILLUSTRATED EMBODIMENTS

Figure 1:
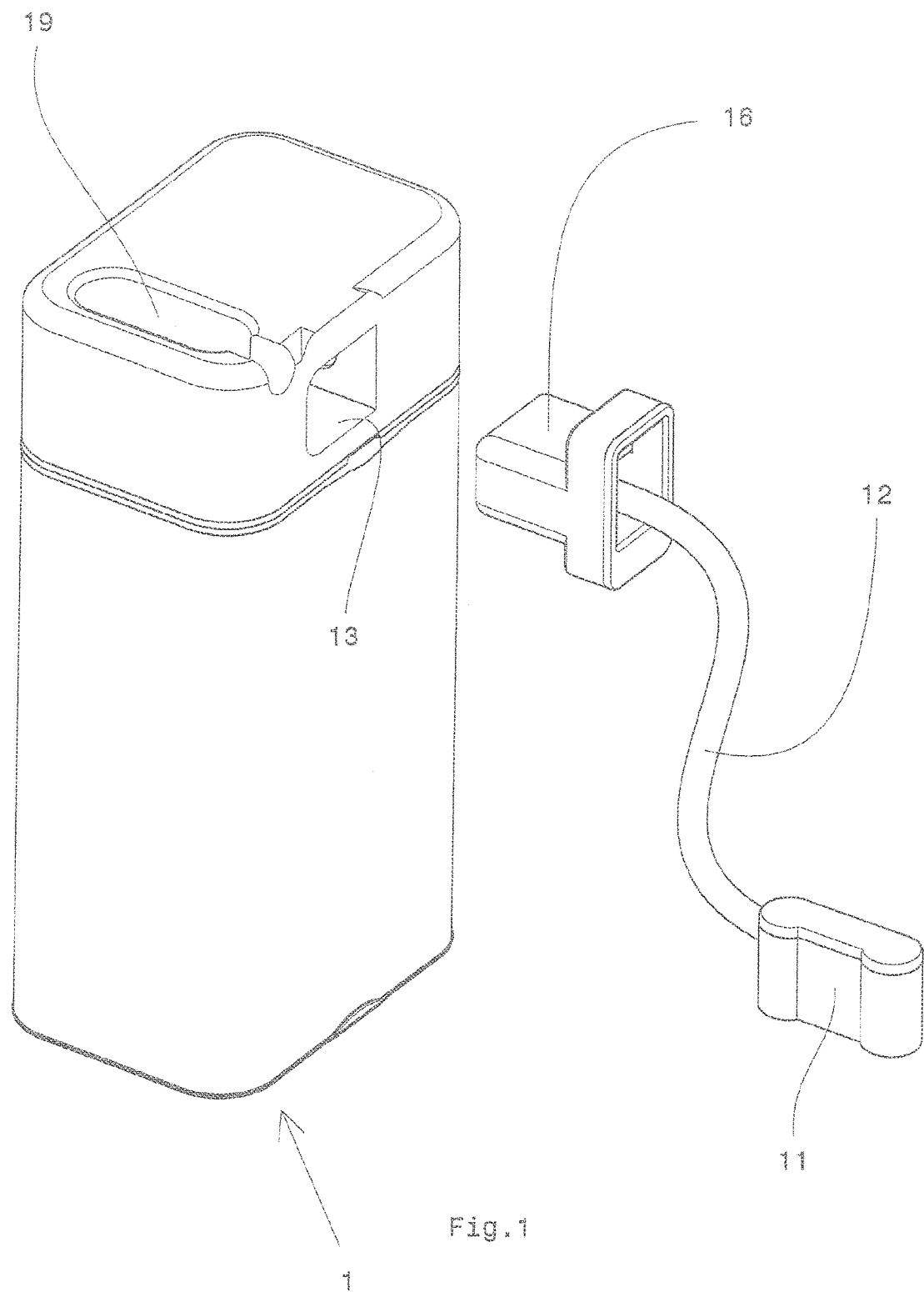
FIG. 1 shows a perspective view of the milk container with the connection terminal of the flexible pipe separate from the relative fixing seat.
Figure 2:
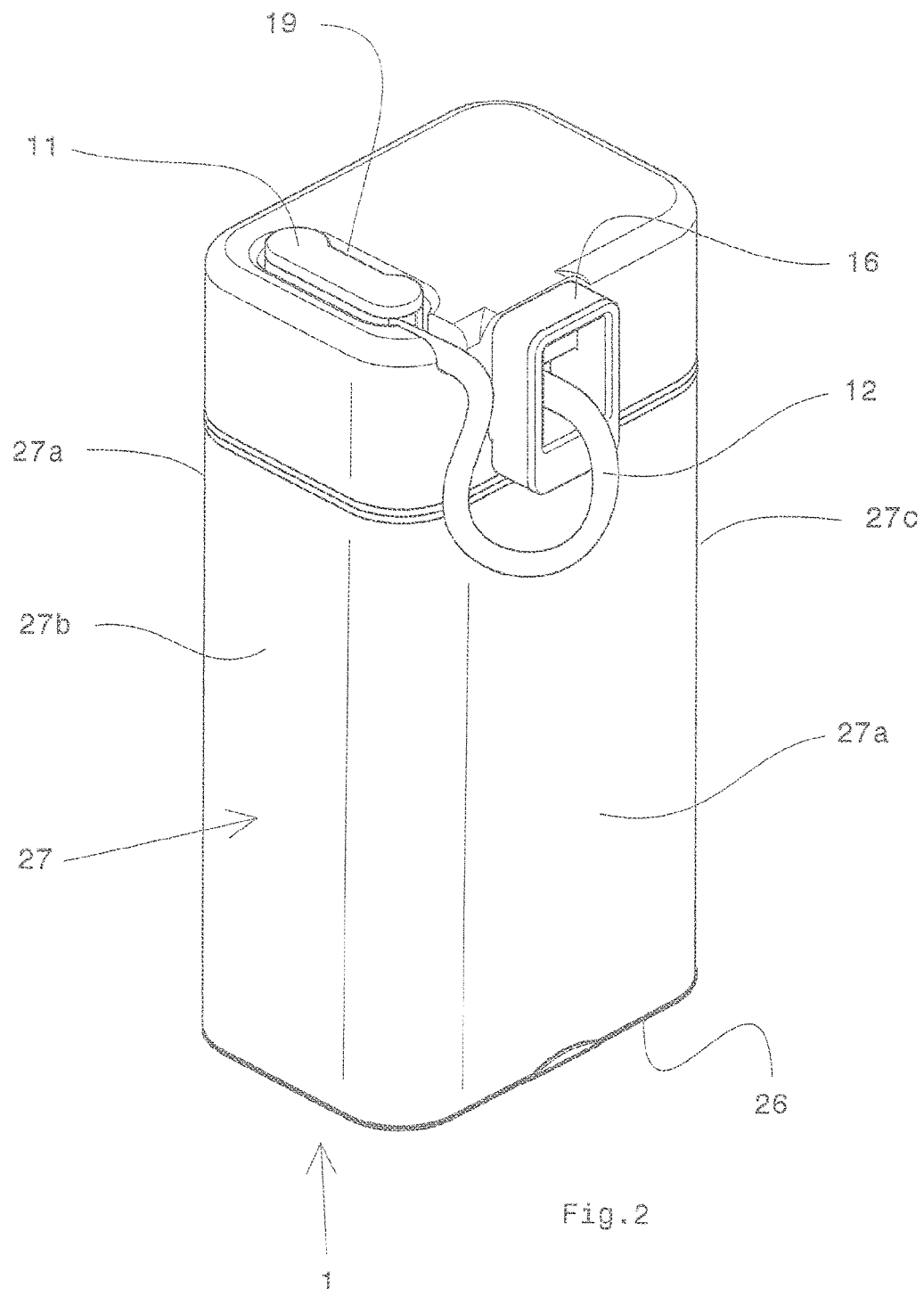
FIG. 2 shows a perspective view of the milk container with the external milk dispenser in the minimum overall dimensions configuration.
Figure 3:
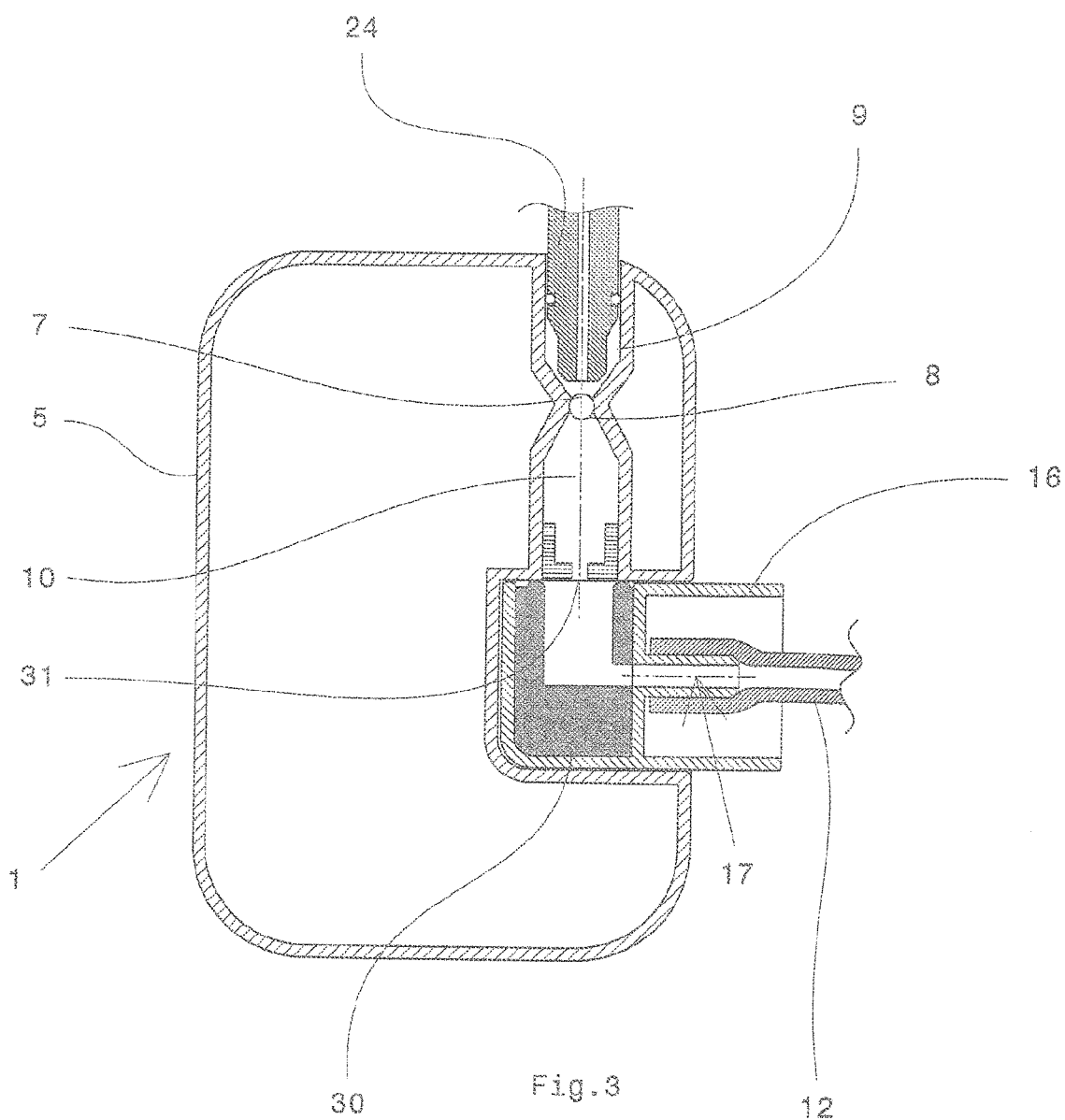
FIG. 3 shows a plan view of the milk container sectioned at the height of the cover.

With reference to the mentioned figures, a coffee machine 2 is shown and a milk container 1 that can be associate with the coffee machine 2;

The coffee machine 2 comprises in a known way an external coffee dispenser 3 positioned at a front wall 23 of the coffee machine 2 at a certain height above a resting surface 14, and a dispensing nozzle for dispensing steam 24 also positioned at the front wall 23 of the coffee machine to the side of the external coffee dispenser 3.

The coffee dispenser 3 is supported translatably perpendicular to the resting surface 14 so as to be able to adjust its position in height above the resting surface 14 without changing its angular orientation and therefore its dispensing direction which remains perpendicular to the resting surface 14.

The coffee dispenser 3 in particular is equipped at the bottom with two dispensing holes 21 distanced in the width direction of the coffee machine 2. The dispensing holes 21 have respective axes oriented in the dispensing direction.

The resting surface 14 is suitable both for resting the milk container 1 and the cups 15, 15'. Naturally, it is possible to provide a resting surface for the milk container 1 and a resting surface for the cups 15, 15' placed at a different height from the resting surface 25 of the coffee machine 2.

The milk container 1 comprises a milk containment body 4, a milk mixing unit 6 and an external dispenser 11 for mixed milk.

The milk containment body 4 is equipped with a bottom 26, a side wall 27 and a cover 5.

Preferably the cover 5 is assembled removably to be handled separately and independently from the rest of the containment body 4.

The side wall 27 of the containment body 9, in the specific case of a quadrangular conformation, comprises two sides 27a that delimit the width dimension of the containment body 4 of the milk container 1, a front wall 27b and a rear wall 27c that delimit the depth dimension of the containment body 4 of the milk container 1.

The mixing unit 6 in the specific case is integrated into the cover 5 of the milk containment body 4 and comprises a mixing chamber 7, a channel 8 for supplying milk to the mixing chamber 7, a channel 9 for supplying steam to the mixing chamber 7, and an outlet channel 10 for mixed milk from the mixing chamber 7.

The outlet channel 10 for mixed milk is in fluid communication with the external milk dispenser 11.

The body of the external dispenser 11 has two dispensing holes 20 at the bottom distanced in the width direction of the milk container 1 and having the same centre-to-centre distance as the coffee dispensing holes 21.

The milk supplying channel 8 extends into the containment body 4 substantially right to the bottom 26 in order to draw the milk contained therein.

The mixing unit 6 also comprises a channel 18 for supplying air to the mixing chamber 7. Such air supplying channel, in communication with the external environment, can be equipped with air flow adjustment means.

The mixing chamber 7 is shaped like a Venturi tube in order to allow the flow of steam coming in from the steam supplying channel 9 to create a depression in the mixing chamber 7 itself thanks to which the milk is sucked from the milk supplying channel 8 and air is sucked from the air supplying channel.

Advantageously the milk container 1 comprises a flexible pipe 12 for the flexible and hydraulic mechanical connection of the external dispenser 11 of mixed milk to the outlet channel 10 of mixed milk.

Furthermore, the external milk dispenser 11 in turn has a means for hooking it to the external coffee dispenser 3.

In practice, the remarkable freedom of movement with respect to the containment body 4 obtained thanks to the connection with the flexible pipe 12 allows the external milk dispenser 11 to be hooked to the external coffee dispenser 3 and its movement to be shared for the combined adjustment of their distance from the resting surface 14.

Hence with just a single operation the position of both the external milk dispenser 11 and the external coffee dispenser 3 can be adapted to the height of the cups 15, 15' to be served.

Preferably the hooking position of the external milk dispenser 11 is in front of the external coffee dispenser 3.

The hooking means are preferably of magnetic type and can for example comprise a magnet 28 and a ferromagnetic element 29 one applied to the external milk dispenser 11 and the other to the external coffee dispenser 3, or vice versa.

In particular, either the magnet or the ferromagnetic element can be applied externally to the front wall of the external coffee dispenser 3 and the other externally to the rear wall of the external milk dispenser 11 so as to be able to join them to one another directly for exerting the maximum connection force. It is also possible to arrange for the ferromagnetic element not to be provided and for the body of either the external milk dispenser 11 or the external coffee dispenser 3 to be made of ferromagnetic material.

The hooking means can alternatively also be of the mechanical type and comprise for example special snap-fit engagement teeth in corresponding seats.

Obviously any other system may also be used that allows the external milk dispenser 11 to be hooked to the external coffee dispenser 3.

It must be noted that the external milk dispenser 11 is preferably in a fixed position but alternatively a hook may be provided in an adjustable position of the external milk dispenser 11 to the external coffee dispenser 3.

The flexible pipe 12 has a connection terminal 16 fixable in a fixing seat 13 obtained in the cover 5.

The outlet end 31 of the mixed milk outlet channel 10 emerges in the fixing seat 13.

The connection terminal 16 has an internal channel 17 for hydraulic connection between the flexible pipe 12 and the outlet channel 10 for the mixed milk.

Inside the connection terminal 16 there is a sealing gasket 30 that can be positioned around the outlet end 31 of the outlet channel 10.

The connection terminal 16 has an inlet and an outlet of mixed milk oriented perpendicular to one another. In practice, the inlet is coaxial to the outlet channel of the mixed milk 10, which extends in the depth direction of the milk container 1, while the outlet extends in the width direction of the milk container 1.

The connection terminal 16 is shapingly connected to the fixing seat 13 by a fixed joint.

The cover 5 has externally a through opening (not shown) through the access thickness thereof inside the containment body 4 for loading milk.

The cover 5 also has a recess 19 configured for placing the external dispenser 11 for mixed milk back in a minimum overall dimensions configuration when it is unhooked from the external coffee dispenser 3.

Preferably the opening for loading milk is obtained at the wall of the recess 19 of the cover 5 so that the external milk dispenser 11 can also act as a closing plug to the opening of the milk loading.

The recess 19 is also configured and sized to completely house the external milk dispenser 11 within it, therefore, when it is stored the total overall dimensions of the milk container 1 do not increase, hence it can be easily placed in the fridge.

With the set made up of the external milk dispenser 11 and the external coffee dispenser 3, two cappuccinos in tall or short cups can be served straight into the cups.

The arrangement of the coffee machine takes place as follows, according to the cups 15, 15' used.

The milk container 1 resting on the resting surface 14 is connected with the steam inlet channel 9 at the steam dispensing nozzle 24 of the coffee machine 2.

The external milk dispenser 11 is hooked to the external coffee dispenser 3.

In the hooked position the dispensing holes 20 of the external milk dispenser 11 are the same distance from the resting surface 14 as the dispensing holes 21 of the external coffee dispenser 3.

The external milk dispenser 11 and the external coffee dispenser are oriented with their two dispensing holes 20, 21 towards an underlying dispensing zone 22 straight into two cups 15, 15' arranged alongside each other on the resting surface 14.

The milk dispensing holes 20 are distanced in the width direction of the milk container 1 and have the same centre-to-centre distance as the coffee dispensing holes 21. Each pair of milk and coffee dispensing holes 20, 21 is aligned in the depth direction of the coffee machine and is oriented towards an underlying positioning zone 22 of the cups 15, 15'.

Figure 4:
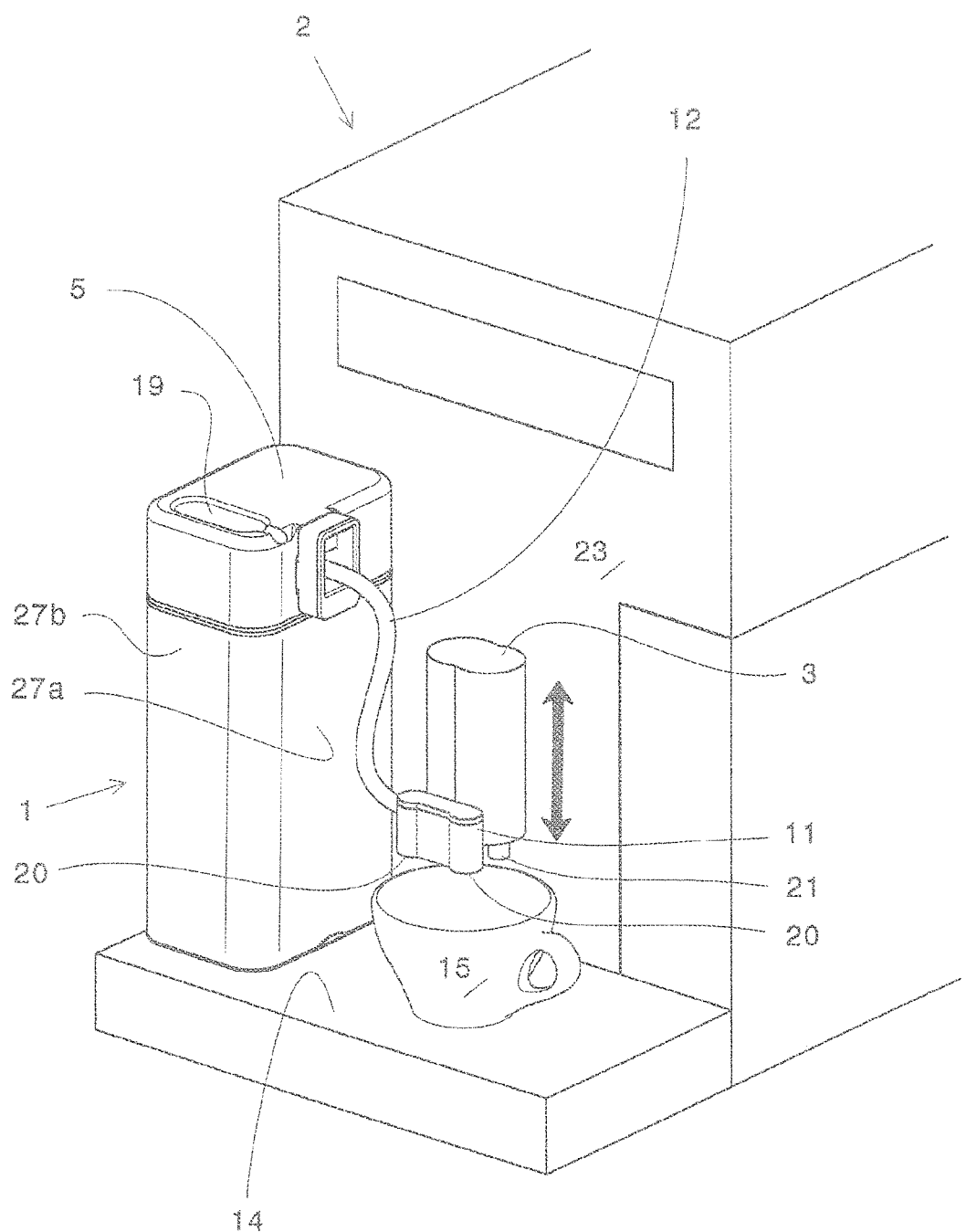
FIGS. 4 and 5 show, respectively, a perspective view and a front view of the coffee machine with the associated milk container, wherein the set made up of the external milk dispenser and the external coffee dispenser is in a less distant position from the resting surface of the cups for dispensing into low cups.
Figure 5:
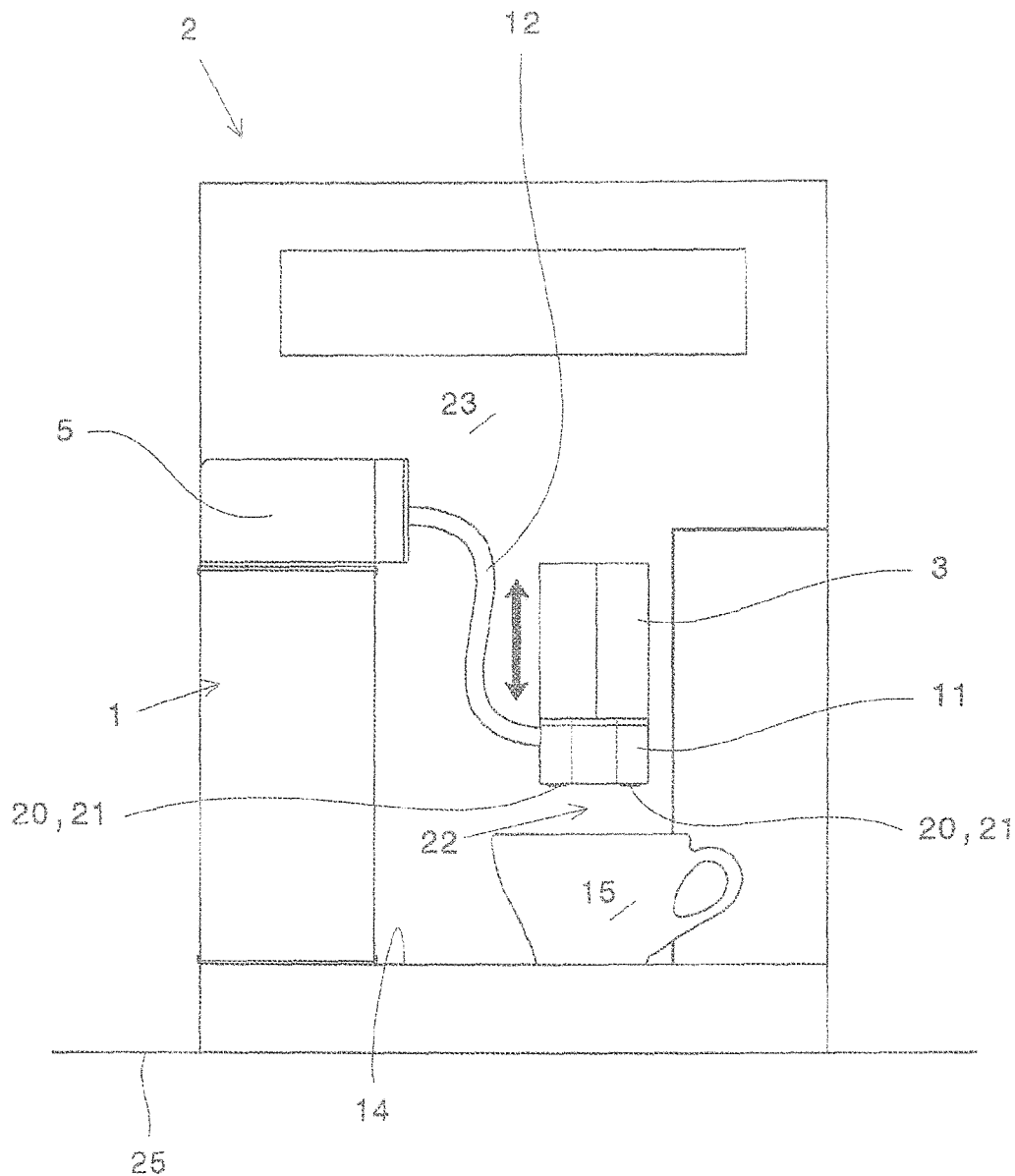

With reference to FIGS. 4 and 5, a cappuccino must be dispensed into a short cup 15.

Before positioning the cup 15 on the resting surface 14, the user adjusts the height position from the resting surface 14 of the set made up of the external coffee dispenser 3 and the external milk dispenser 11 for adapting it to the specific height of the cup 15. All the dispensing holes 20, 21 are within vertical generatrices of the cup 15 for dispensing right into it.

Figure 6:
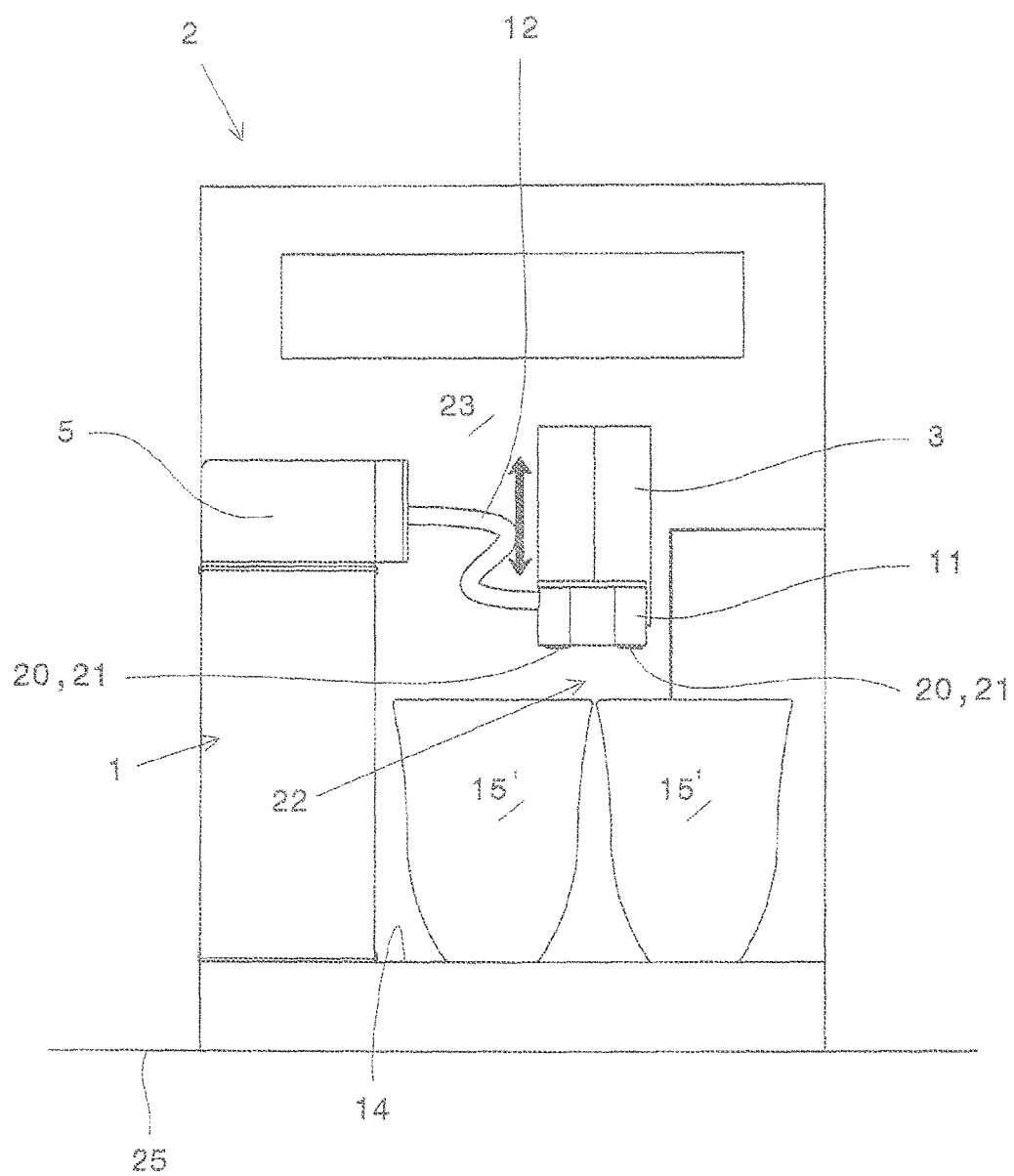
FIG. 6 shows a perspective view of the coffee machine with the associated milk container wherein the set made up of the external milk dispenser and the external coffee dispenser is in a more distant position from the resting surface of the cups with respect to the situation illustrated in FIGS. 4 and 5 for dispensing into taller cups than those illustrated in FIGS. 4 and 5.
Figure 7:
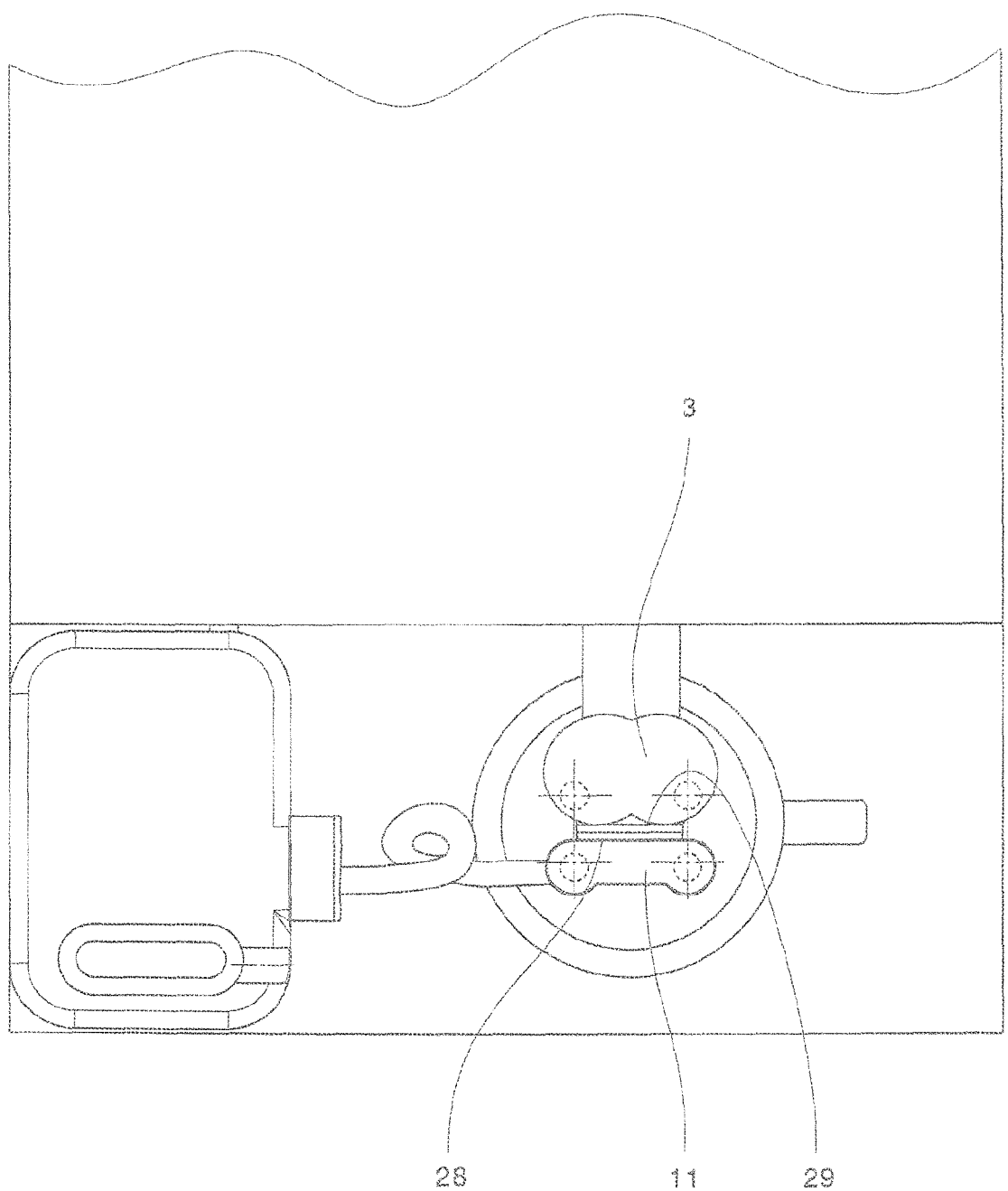
FIG. 7 shows a plan view of the coffee machine with the associated milk container.
Figure 8:
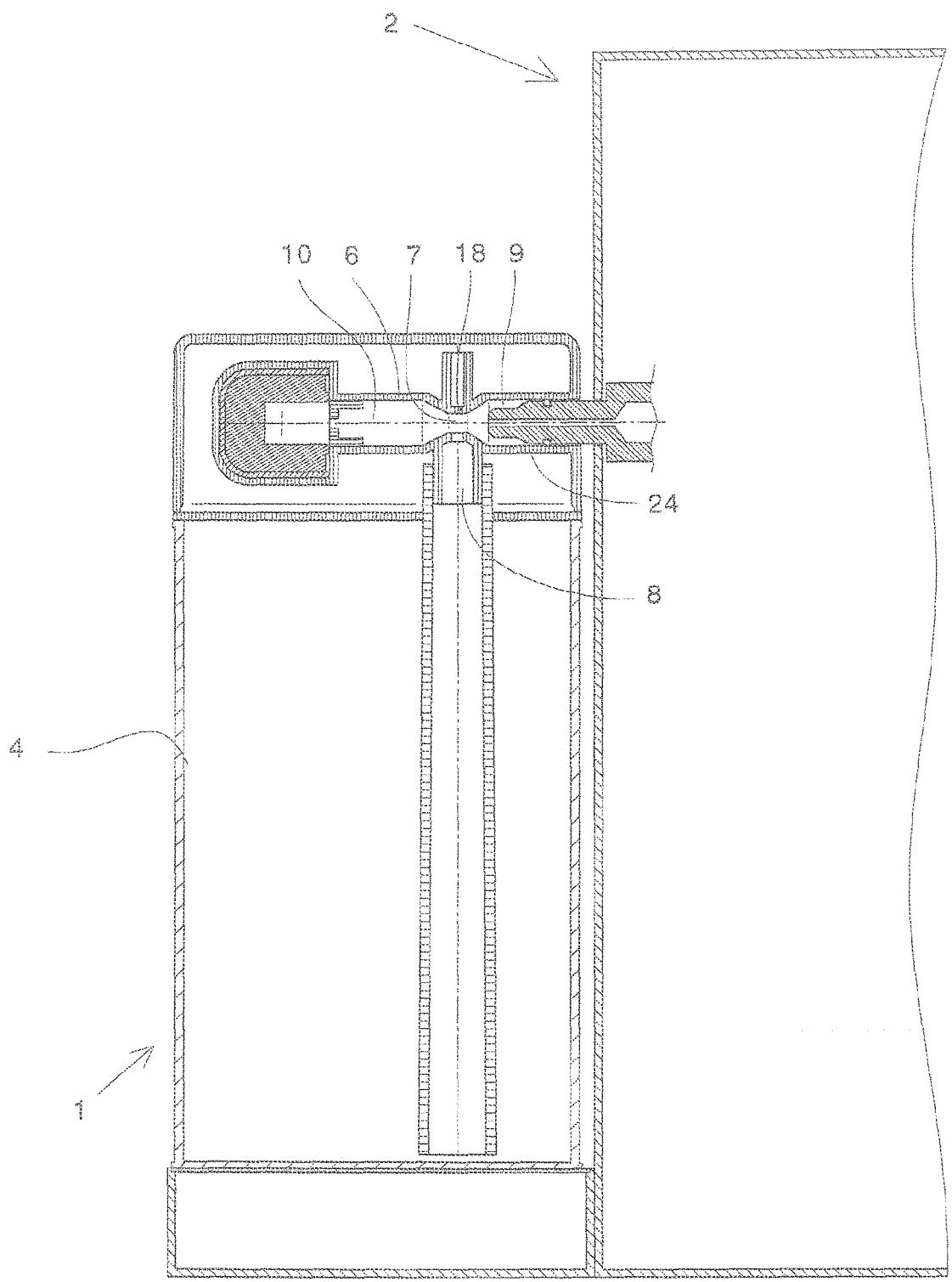
FIG. 8 shows a raised lateral sectional view of the coffee machine with the associated milk container.

With reference to FIG. 6, two cappuccinos must be dispensed simultaneously into two tall cups 15'.

Before positioning the cups 15' side-by-side on the resting surface 14, the user adjusts the height position from the resting surface 14 of the set made up of the external coffee dispenser 3 and the external milk dispenser 11 to adapt it to the specific height of the cups 15'. Each pair of dispensing holes 20, 21 is within the vertical generatrices of a corresponding cup 15' for dispensing right into it. In this case the set comprising the external coffee dispenser 3 and the external milk dispenser 11 is in a raised position with respect to the one assumed in the case shown in FIGS. 4 and 5, for considering the taller cups 15' compared to the cups 15 used in the case illustrated in FIGS. 4 and 5.

The milk container that can be associated with a coffee machine as conceived herein is susceptible to many modifications and variations, all falling within the scope of the invented concept; furthermore, all the details can be replaced by technically equivalent elements.

The materials used, as well as the dimensions, may in practice be of any type according to requirements and the state of the art.

What is claimed is:

1. A milk container that can be associated with a coffee machine having an external coffee dispenser, the milk container comprising:
   a containment body for containing milk, the containment body having a cover removably supported by the containment body;
   a mixing unit integrated into the cover, wherein the mixing unit and the cover are integrally removable from the containment body, the mixing unit comprising:
      a mixing chamber;
      a milk channel for supplying milk to the mixing chamber:
      a steam channel for supplying steam to the mixing chamber;
      a air channel for supplying air to the mixing chamber; and
      an outlet channel for milk mixed with air and steam from the mixing chamber;
   an external dispenser of the mixed milk having a hooking device providing releasable attachment of the external dispenser of the mixed milk to the external coffee dispenser; and
   at least one flexible pipe, providing flexible mechanical and hydraulic connection of the external dispenser of the mixed milk to the outlet channel;
   wherein the external coffee dispenser is vertically slidable relative to the coffee machine, wherein the external dispenser of the mixed milk, when hooked to the external coffee dispenser, is vertically slidable integrally with the external coffee dispenser relative to the coffee machine, and wherein the external dispenser of the mixed milk and the external coffee dispenser are jointly adjustable in height relative to the mixing unit integrated into the cover as supported by the containment body.

2. The milk container of claim 1, wherein the mixing unit is integrated into a cover of the containment body for containing milk.

3. The milk container of claim 2, wherein the at least one flexible pipe has a connection terminal fixable in a fixing seat of the cover, located where the outlet channel for the mixed milk emerges.

4. The milk container of claim 3, wherein the connection terminal has an internal channel for hydraulic connection between the flexible pipe and the outlet channel for the mixed milk.

5. The milk container of claim 3, wherein the connection terminal is connected to the fixing seat by a fixed joint.

6. The milk container of claim 2, wherein the cover includes externally a through opening, through an access thickness thereof inside the containment body, for loading milk.

7. The milk container of claim 2, wherein the cover has a recess configured for placing the external dispenser for mixed milk therein, when not in use, thereby providing a minimum overall dimensional configuration of the milk container when the external dispenser is unhooked from the external coffee dispenser.

8. The milk container of claim 7, wherein the cover includes externally a through opening, through an access thickness thereof inside the containment body, for loading milk, and wherein the through opening is located at a wall of the recess of the cover.

9. The milk container of claim 1, wherein the external dispenser of mixed milk includes two dispensing holes.

10. The milk container of claim 1, wherein the hooking device is magnetic.

11. The milk container of claim 1, wherein the hooking device is of mechanical type.

12. A coffee machine having at a front wall thereof an external coffee dispenser that is adjustable in height with respect to a resting surface for cups, wherein the coffee machine further comprises the milk container of claim 1.

13. The coffee machine of claim 12, wherein the external dispenser for mixed milk is hooked to, and is hooked at a front of, the external coffee dispenser.

14. The coffee machine of claim 13, wherein the external coffee dispenser has two dispensing holes.

15. The coffee machine of claim 14, wherein the external dispenser for mixed milk has two dispensing holes.

16. The coffee machine of claim 15, wherein the external dispenser for mixed milk and the external coffee dispenser are oriented with the two respective dispensing holes thereof directed towards an underlying zone for direct dispensing into two cups simultaneously, where the two cups can be positioned next to one another on the resting surface.

17. A coffee machine comprising:
   an external coffee dispenser vertically slidable relative to the coffee machine and vertically adjustable in height relative to a resting surface for cups; and
   an associated milk container comprising:
      a containment body for containing milk, the containment body having a cover removably supported by the containment body;
      a mixing unit integrated into the cover, wherein the mixing unit and the cover are integrally removable from the containment body, the mixing unit having an outlet channel;
      an external dispenser of the milk having a hooking device providing releasable attachment of the external dispenser of the milk to the external coffee dispenser; and
      at least one flexible pipe, providing flexible connection of the external dispenser of the milk to the outlet channel and movability of the external dispenser of the milk for use;
   wherein the external dispenser of the mixed milk, when hooked to the external coffee dispenser, is vertically slidable integrally with the external coffee dispenser relative to the coffee machine and is vertically adjustable in height integrally with the external coffee dispenser relative to the resting surface for cups; and
   wherein the external dispenser of the mixed milk and the external coffee dispenser are jointly adjustable in height relative to the mixing unit integrated into the cover as supported by the containment body.

* * * * *